United States Patent [19]

Baba et al.

[11] Patent Number: 4,557,052
[45] Date of Patent: Dec. 10, 1985

[54] MOWING MACHINE WITH ANNULAR INERTIA SHIFTER

[75] Inventors: Toru Baba, Yokosuka; Yasuo Saito, Fujisawa, both of Japan

[73] Assignee: Kioritz Corporation, Tokyo, Japan

[21] Appl. No.: 577,709

[22] Filed: Feb. 7, 1984

[30] Foreign Application Priority Data

Feb. 8, 1983 [JP] Japan .................................. 58-16219

[51] Int. Cl.[4] .............................................. A01D 50/00
[52] U.S. Cl. ........................................ 30/276; 30/347; 56/12.7
[58] Field of Search ................. 30/276, 347; 56/12.7

[56] References Cited

U.S. PATENT DOCUMENTS

| 4,189,833 | 2/1980 | Kwater | 30/276 |
| 4,195,408 | 4/1980 | Palmieri | 30/276 |
| 4,236,309 | 12/1980 | Cayou | 30/276 |
| 4,242,797 | 1/1981 | Palmieri | 30/276 |

*Primary Examiner*—Jimmy C. Peters
*Attorney, Agent, or Firm*—Fleit, Jacobson, Cohn & Price

[57] ABSTRACT

A mowing machine is provided with its cutting head employing one or more flexible cutting lines such as Nylon cords which serve to cut grasses during rotation of the cutting head. The free end portions of the cutting lines extend radially outwardly from a casing through openings in an annular inertia shifter which is housed in the casing for vertical and angular movements relative to the casing.

6 Claims, 5 Drawing Figures

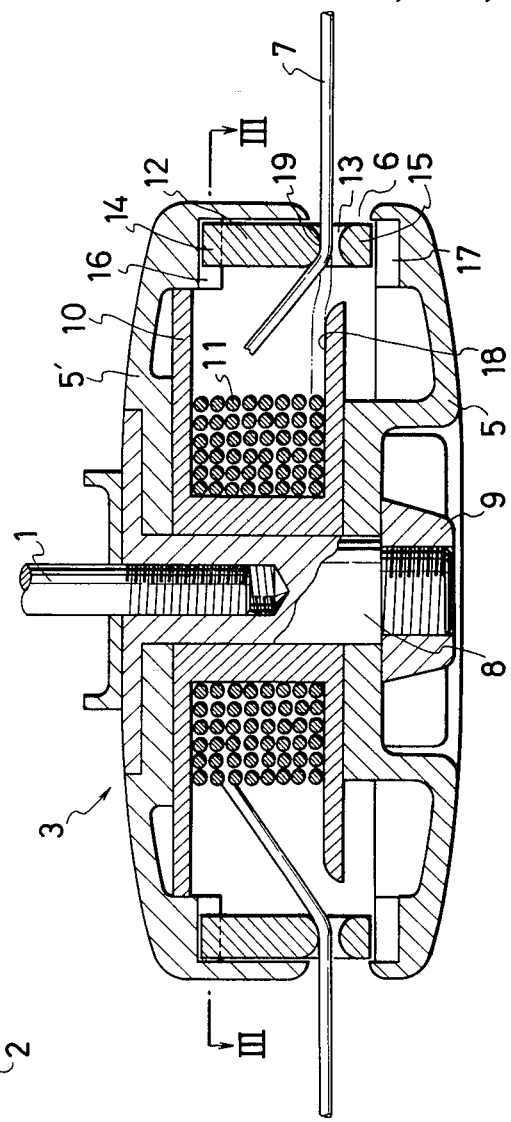
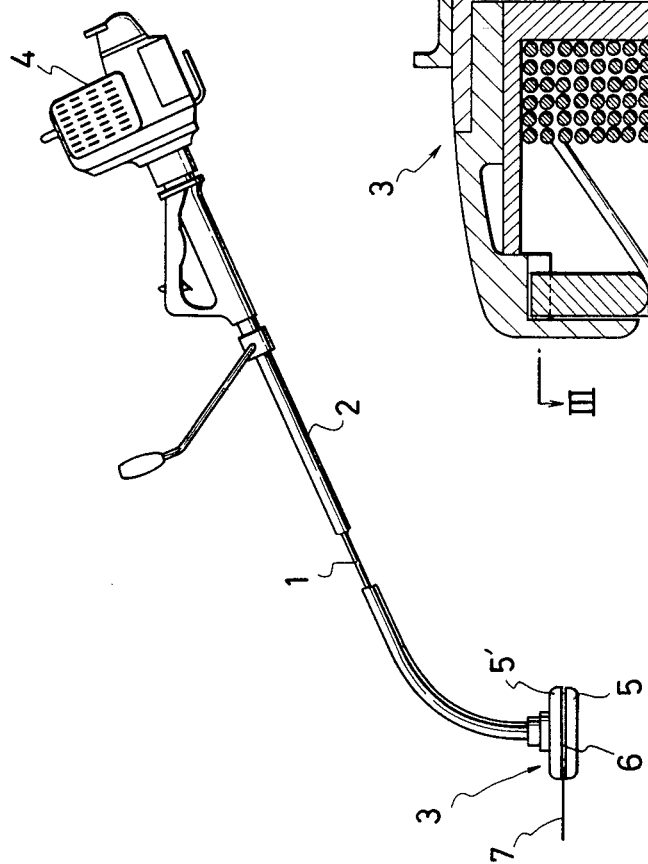

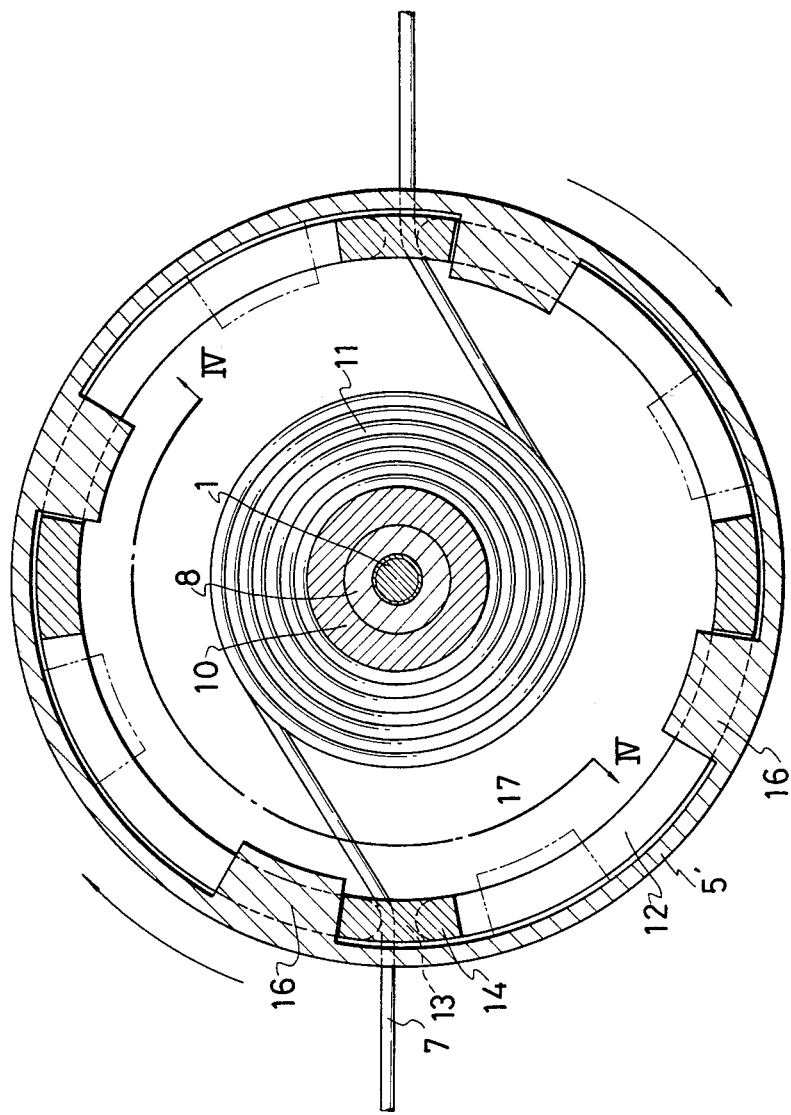

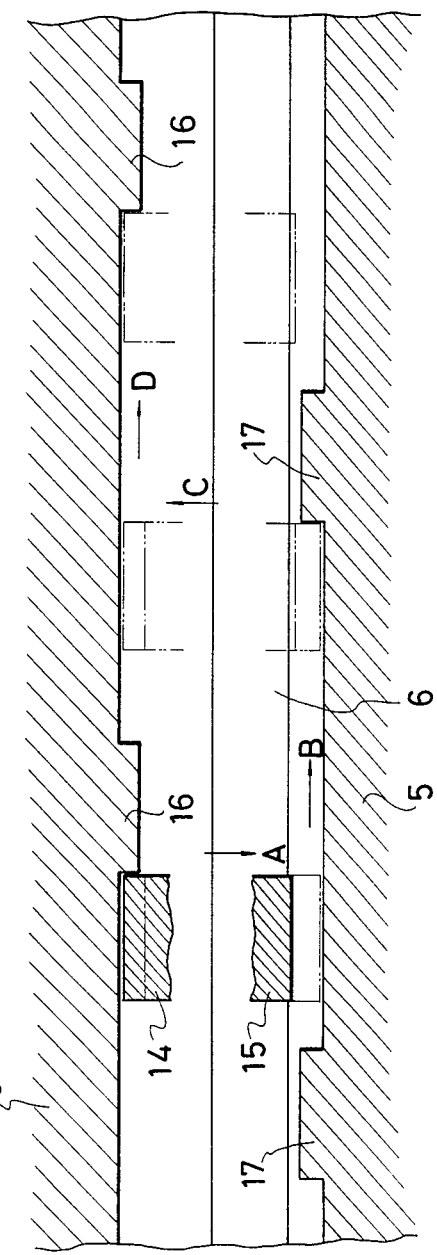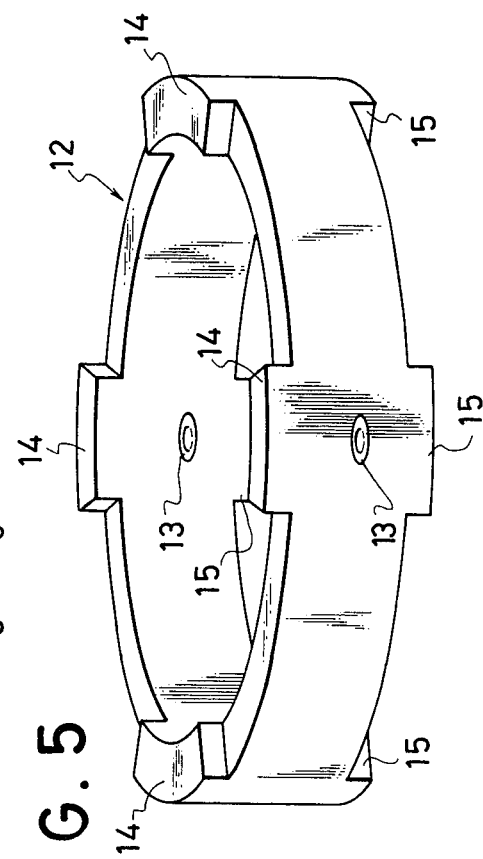

MOWING MACHINE WITH ANNULAR INERTIA SHIFTER

The present invention relates to mowing machines employing one or more flexible cutting lines such as Nylon cords as cutting blades.

In such mowing machines, flexible cutting lines are housed in the form of coils in a casing and have free end portions extending radially outwardly through openings formed in the casing as its periphery. During mowing operation, the free end portions of the cutting lines are stretched radially outwardly of the casing under the action of the centrifugal force to cut grasses. As compared with steel cutting blades in a conventional mowing machine, the flexible cutting lines are liable to wear off during the mowing operation. When the free end portions of the cutting lines have worn off, there is a need for extraction of the cutting lines from their coils through the openings. In order to ensure that such an extraction operation can be performed without any stoppage of a motor, there have been known semi-automatic feeders comprising a shifter serving to extruct the cutting lines and adapted to be operated by a change in the centrifugal force caused by a variation in rotational speed of the mowing machine head or by applying to the shifter an external force caused by striking the mowing machine head against the ground.

A main object of the present invention is to provide a mowing machine which is capable of extraction of the cutting lines from their coils through a casing means of a cutting head during a mowing operation without varying the rotational speed of the cutting head or striking it against the ground.

Another object of the present invention is to provide a mowing machine wherein an annular inertia shifter is disposed in the casing of the cutting head for vertical and angular movements relative to the casing. The annular shifter is provided with openings through which the free end portions of the cutting lines extend radially outwardly and when the mowing machine is swung vertically during its operation to move vertically the inertia shifter relative to the casing, the inertia shifter is angularly moved relative to the casing under the action of the certrifugal force on the free end portions of the cutting lines to extract the cutting lines from their coils through the openings in the shifter a predetermined length.

In a preferred embodiment of the present invention, the cutting lines are wound around a spool fixedly secured within the casing means. The casing means includes casing and a cap defining an annular space therebetween. The inertia shifter surrounds the spool within the casing means and has openings formed in the portion of the shifter which is exposed to the annular space. The inertia shifter is provided with a plurality of upper circumferentially spaced projections formed thereon and adapted to engage a plurality of circumferentially spaced projections on the casing during mowing operation of the machine. A plurality of lower circumferentially spaced projections may be formed on the shifter in an opposite relation to the upper projections to engage projections each formed on the cap at a position intermediate between the two adjacent projections on the casing so as to being capable of extracting the cutting lines a predetermined length on halves.

Other objects and advantages of the present invention will become apparent from the following description on a preferred embodiment thereof which is shown in the accompanying drawings;

FIG. 1 is a perspective view of a mowing machine according to the present invention;

FIG. 2 is a vertical cross sectional view of a cutting head of th mowing machine shown in FIG. 1;

FIG. 3 is a cross sectional view of the cutting head taken along line III—III of FIG. 2;

FIG. 4 is a fragmental cross-sectional view of the cutting head taken along line IV—IV of FIG. 3; and FIG. 5 is a perspective view of an inertia shifter housed in the cutting head.

Referring now to FIG. 1 of the drawings, there is shown a mowing machine according to the present invention comprising a rotary cutting head 3 rotatably mounted on a hallow rod 2 at its lower end. The hollow rod 2 has a small internal combustion engine 4 mounted at the upper end thereof and is provided with a flexible driving shaft 1 extending from the engine 4 to the rotary cutting head 3 and inserted in the hollow rod 2. Referring now to FIG. 2, the rotary cutting head 3 comprises a cup-shaped casing 5' having a central boss 8 fixedly secured thereto and threadedly connected to the lower end of the flexible driging shaft 1, a spool 10 fitted on the boss 8 and a cap 5 fitted on the boss 8 and locked to the cup-shaped casing 5' by a nut 9 which threadedly engages the lower threaded end of the boss 8 to clamp the spool 10 between the casing 5' and the cap 5 for rotation therewith. The spool 10 has flexible cutting lines 11, such as Nylon cords wound thereon in a direction opposite to a direction of rotation of the cutting head 3. Defined between the casing 5' and the cap 5 is an annular space 6 through which the free end portions 7 of the cutting lines 11 extend radially outwardly.

An annular inertia shifter 12 is mounted within the casing 5' for vertical and angular movements relative to the casing 5' and provided with a plurality of upper and lower circumferentially equally spaced projections 14 and 15 oppositely formed on the upper and lower ends thereof. The casing 5' and the cap 5 are also provided with a plurality of circumferentially equally spaced projections 16 and 17 cooperating with the upper and lower projections 14 and 15 on the inertia shifter 12, respectively. Each of the projections 17 on the cap 5 is positioned intermediate the two adjacent projections 16 on the casing 5'. Formed in the portion of the inertia shifter 12 which is exposed to the annular space 6 between the casing 5' and the cap 5, are two diametrically opposite openings 13 each positoned intermediate the opposite upper and lower projections 14 and 15 on the inertia shifter 12. Each of the openings 13 serves to bear the free end portion 7 of the cutting line 11 passed therethrough and preferably, has a curved convex surface in section to avoid any concentration of stress on the cutting line. The openings 13 may be in the form of slots opening into the upper end or lower end of the inertia shifter 12.

During rotation of the rotary cutting head 3, the inertia shifter 12 is positioned in the casing 5' with the leading edge of each of the projections 14 engaging the trailing edge of each of the projections 16 on the casing 5'. This is achieved by winding the cutting lines 11 on the spool 10 in the direction opposite to the direction of rotation of the rotary cutting head 3 and by the centrifugal force acting on the free end portions of the cutting lines passed through the openings 13 in the inertia shifter 12 to tend to forwardly rotate the inertia shifter 12 relative to the casing 5' until the leading edge of each projection 14 on the shifter 12 engages the trailing edge of the projection 16 on the casing 5'.

During the mowing operation, it is necessary to maintain the inertia shifter 12 at its lifted position where the projections 14 on the shifter 12 engage the projections 16 on the casing 5' in order to prevent downward movement and subsequent rotation of the inertia shifter 12 relative to the casing 5', which would result in an unforeseen extraction of the cutting lines from their spool 10 through the openings 13 in the shifter 12. To this end, each of the openings 13 is positioned such that when the inertia shifter 12 is in its lifted position where the upper projections 14 on the shiftes 12 engage the projections 16 on the casing 5', the top 19 of the curved surface of the opening 13 should be spaced axially from the inner surface 18 of the lower one of the spool flanges a distance slightly less than a diameter of the cutting line 11 extending through the opening 13 to bend it downwardly. During the rotation of the rotary cutting head 3, the downwardly bent portions of the cutting lines have a tendency to be stretched outwardly due to the centrifugal force acting on the free end portions of the cutting lines so that the tension on the cutting lines causes the shifter 12 to push up thereby maintaining engagement of its projections 14 with the projections 16 on the casing 5'. Alternatively, in order to achieve the downward bending of the cutting lines, barrier rings (not shown) may extend upwardly from the cap 5 so as to surround the periphery of the spool 10.

In operation, the internal combustion engine 4 is started to rotate the flexible driving shaft 1 so that the casing 5' and cap 5 of the cutting head 3 rotate with the spool 10 fixedly secured therewithin. The centrifugal force causes the free end portions of the cutting lines 11 passed through the openings 13 to stretch radially outwardly, thereby lifting and rotating the inertia shifter 12 relative to the casing 5' in its direction of rotation until the leading edges of the projections 14 on the shifter 12 engage the trailing edges of the projections 16 on the casing 5' (see FIG. 3). During the mowing operation, the shifter 12 is rotated in the direction opposite to the direction of the rotation of the cutting head 3 at the time when the free end portions of the cutting lines 11 hit the grasses so that each of the projections 14 on the shifter 12 circumferentially oscillates between the two adjacent projections 16 and 16 on the casing 5'. Because of the oscillation of the projections 14 on the shifter 12, a point of contact of the free end portions of the cutting line 11 with the openings 13 moves along the length of cutting lines to minimize the chances of their breakage.

When the tip of each of the free end portions of the cutting lines 11 has worn off and it is desired to extract the free end portions 7 from the spool 10 through the openings 13, the mowing machine is swung vertically by an operator during its operation to move the shifter 12 with its inertia relative to the casing 5' as indicated by arrow A in FIG. 4 so that the upper projections 14 on the shifter 12 disengage from the projections 16 on the casing 5'. Due to the fact that the free end portions of the cutting lines 11 are being stretched outwardly under the action of the centrifugal force, the shifter 12 is moved in a direction of arrow B until the lower projections 15 on the shifte 12 engage the projections 17 on the cap 5 so that the cutting lines 11 are extracted from the spool 10 through the openings 13 by half of a predetermined length. Then, the shifter 12 is lifted as indicated by arrow C by the outward force on the free end portions 7 of the cutting lines 11 so that the lower projections 15 on the shifter 12 disengage from the projections 17 on the cap 5. The outward force on the free end portions 7 of the cutting lines 11 also causes the shifter 12 to move forward relative to the casing as indicated by arrow D until the upper projections 14 on the shifter 12 engage the projections 16 on the casing 5', thereby extracting the cutting lines by the other half.

It will be seen from the foregoing that when the mowing machine is swung, the inertia on the shifter and the centrifugal force on the free end portions of the cutting lines result in the vertical and angular movement of the shifter 12 relative to the casing, thereby causing the cutting lines 11 to automatically extruct from their spool 10 through the openings 13 the predetermined length.

In the preferred embodiment of the present invention, in order to extruct the cutting lines 11 from their spool 10 a predetermined length on halves, the upper and lower projections are formed on the shifter 12 in the opposite relation and each of the projections 17 on the cap 5 is positioned intermediately between the two adjacent projections 16 on the casing 5'. Alternatively, only the upper projections 14 and the projections 16 may be formed on the shifter 12 and the casing 5', respectively.

It will be apparent from the foregoing that many other variations and modifications may be made in structures described herein without departing from the essential concept of the present invention.

What is claimed is:

1. A mowing machine having a cutting head comprising a driving shaft, a casing means fixedly secured to the driving shaft for rotation therewith and having a plurality of circumferentially spaced projections formed thereon, at least one flexible cutting line in the form of a coil wound on a spool housed in and removably fixed to the casing means and having a free end portion, an annular inertia shifter disposed in the casing means in a relation surrounding the coil and the spool at its radial outward position for vertical and angular movements relative to the casing means and having a plurality of circumferentially spaced projections formed thereon and adapted to engage said projections on the casing means during the mowing operation of the machine, said inertia shifter being provided with at least one opening through which said free end portion of the cutting line extended radially outwardly.

2. The mowing machine of claim 1 wherein said casing means comprises an upper casing portion and a lower cap portion fixedly secured to one another and said casing means projections are located at circumferentially spaced portions on said upper casing portion and said cap portion.

3. The mowing machine of claim 1 wherein said casing means includes an upper casing portion and a lower cap portion with said circumferentially spaced projections of said casing means being located on only said upper casing portion and extending downwardly therefrom.

4. The mowing machine of claim 3 wherein said circumferentially spaced projections on said inertia shifter are on only an upper surface thereof and extend upwardly to engage the downwardly extending projections on said upper casing portion.

5. The mowing machine of claim 2 wherein said spool is clamped between said casing portion and said cap portion for rotation therewith.

6. The mowing machine of claim 1 wherein said annular inertia shifter has two openings formed in an annular wall thereof for two flexible cutting lines.

* * * * *